United States Patent [19]
Wan

[11] Patent Number: 5,710,905
[45] Date of Patent: Jan. 20, 1998

[54] CACHE CONTROLLER FOR A NON-SYMETRIC CACHE SYSTEM

[75] Inventor: Ricky Wan, Fremont, Calif.

[73] Assignee: Cypress Semiconductor Corp., San Jose, Calif.

[21] Appl. No.: 575,985

[22] Filed: Dec. 21, 1995

[51] Int. Cl.$^6$ .................................................. G06F 12/00
[52] U.S. Cl. .............................................. 395/445; 395/403
[58] Field of Search .............................. 369/49; 395/403, 395/445, 455, 446

[56] References Cited

U.S. PATENT DOCUMENTS

| | | | |
|---|---|---|---|
| 4,996,641 | 2/1991 | Talgam et al. | 395/445 |
| 5,014,195 | 5/1991 | Farrell et al. | 395/455 |
| 5,091,850 | 2/1992 | Culley | 395/403 |
| 5,210,843 | 5/1993 | Ayers | 395/455 |
| 5,261,066 | 11/1993 | Jouppi et al. | 395/449 |
| 5,465,342 | 11/1995 | Walsh | 395/446 |
| 5,535,359 | 7/1996 | Hata et al. | 395/446 |
| 5,548,742 | 8/1996 | Wang et al. | 395/455 |
| 5,553,258 | 9/1996 | Godiwala et al. | 395/403 |

Primary Examiner—Tod R. Swann
Assistant Examiner—Christopher S. Chow
Attorney, Agent, or Firm—Blakely Sokoloff Taylor & Zafman LLP

[57] ABSTRACT

A cache controller includes a hit determination circuit that is adapted to handle a non-symmetric cache. This hit determination circuit includes symmetric match circuit having a first input port for receiving addresses from a host processor bus and a second input port for receiving a tag entry from a cache tag memory. The symmetric match circuit compares the address to the tag entry and generates a symmetric match signal when there is a match between the address and the tag entry. A non-symmetric circuit that includes a first input port for receiving an address from the host processor bus and a second input port for receiving a predetermined pattern of bits is also provided. The non-symmetric match circuit generates a non-symmetric match signal when the address matches the predetermined pattern. A hit signal generator that is coupled to the symmetric match circuit and a non-symmetric match circuit generates a hit signal which indicates whether or not the current address is stored in the cache memory.

12 Claims, 4 Drawing Sheets

CACHE CONTROLLER FOR A NON-SYMETRIC CACHE SYSTEM

BACKGROUND OF THE INVENTION

1. Field of Invention

The present invention relates generally to the field of cache controllers. More particularly, the present invention provides a method and apparatus for supporting a cache memory system, which has cache subsystems of different sizes.

2. Description of the Related Art

Cache memories are simply high-speed buffer memories that are placed between a processor and a main memory. When a memory access to main memory is to be performed, a request for an address is presented to the cache memory. A tag portion of the cache memory, along with associated cache controller logic, determines whether or not a data portion of the cache contains the data associated with that requested address. If the cache memory contains that particular data, the cache memory delivers the data, else it signals a cache miss.

Cache memory is typically implemented using an associative memory. The cache memory includes the tag portion and the data portion. The tag portion includes a plurality of entries, each entry being paired with a corresponding entry in the data memory. When a requested tag (i.e., the address) is presented to the tag memory, a determination is made whether or not the cache contains data corresponding to that tag. Each entry of the tag memory includes a memory to store a particular tag and a comparator to compare that tag with the requested tag. A "hit" is generated by an entry x when tagx equals the requested tag. When a "hit" is noted, line X in the data memory will be accessed. When none of the entries produces a hit, a "miss" is signaled.

A cache generally follows the following sequence of steps in its operation. First, the cache memory is presented with an address. A search is made in the cache tag memory for the address. If an address is found, a cache "hit" is indicated. Upon a cache "hit", the corresponding line of information of the data memory is sent to the processor. Moreover, the line status is updated. Once the associated line from the data memory is accessed, the requested bytes within that line are selected. These selected bytes are sent to the processor.

If, after a search of the tag memory, none of the tag entries matches the address, a cache "miss" is generated. The address is sent to main memory. A line from main memory is accessed. This line is stored in the data memory of the cache, and certain requested bytes are selected from this line and sent to the processor. Upon a "miss", the cache system also selects an existing cache entry for replacement if the cache is currently full. After a replacement policy determined, the received line from the main memory is then stored into the predetermined line in the cache.

An important design aspect of a cache is the placement of lines of main memory into the cache memory. Because SRAMs that are used to implement a cache are much more expensive than the DRAMs used for main memory, a cache is generally much smaller than main memory, so that several memory lines map onto the same cache line. The two most frequently used placement policies are direct mapping and set associative. In the following discussion, consider a computer system having a main memory of 1 Megabyte and a 16K byte cache. The 1 Megabyte main memory is addressable with 20 bits (i.e., $2^{19}$). Each line contains 16 bytes. Thus, main memory consists of 64K lines, and the cache can hold up to 1024 lines.

In a direct mapping scheme, line x in main memory is placed in line (x modulo 1024) in a cache. An address may be divided into 3 fields. A 10-bit line field may be used to access an entry in the cache. A 6-bit tag field may be used to check whether an addressed entry in the cache contains the requested line. A 4 byte field may be used to address part of a line. A direct map scheme forces each line in memory to map to only one cache line.

In a set-associative cache, a cache is divided into N sets, each containing M lines. If O is the number of lines in the cache, then N equals O divided by M, defining the set size or set associativity. For example, when N equals 4 (i.e., a 4-way, set associative cache), there are M equals O divided by N equals 1024 divided by 4 equals 256 lines. A line can now be found by using the 8 middle bits of an address to select a set (line X of main memory is placed in set X modulo M equals X modulo 256) and then associatively comparing the tags.

The One-Way Set Associative Caches (Direct Map) and Multi-Way Set Associative Caches that have cache banks all with the same size (i.e., a symmetric cache) are well known in the art. The disadvantage of these symmetric cache systems that include cache banks with the same size is that when a user wants to upgrade his existing cache with a larger size cache, the user must either 1) buy an upgrade cache having the same size as the existing cache; or 2) buy a new cache having a larger size and discard the existing cache. These are the only options available to one who wants to upgrade his cache system because current cache controllers only support "symmetric" caches.

It is evident that the prior art cache systems at best severely limit a user's upgrade options by limiting a new cache to the same size as an existing cache or at worst forces the user to wastefully discard existing cache.

Thus, there is a need for a cache system that obviates the need to wastefully discard an existing cache and to eliminate configuration limitations imposed by prior art cache systems.

SUMMARY OF THE INVENTION

To effectively address and solve the problems mentioned in the background, a method and apparatus for supporting a cache having cache banks that are of different sizes (i.e., "non-symmetric" cache) is provided. The present invention includes a cache controller having a "non-symmetric" match logic that supports a cache having a plurality of data banks where at least two of the banks are of different sizes.

In the preferred embodiment, the present invention is implemented in a cache controller. The present invention includes a hit determination circuit adapted to handle non-symmetric caches. This hit determination circuit includes a symmetric match circuit for generating a symmetric match signal. A symmetric match circuit includes a first input port for receiving an address from a host processor bus and a second input port for receiving a tag entry from a cache tag memory. The symmetric match circuit compares the address with the tag entry and if there is a match, generates the symmetric match signal.

The hit determination circuit also includes a non-symmetric match circuit for generating a non-symmetric match signal. The non-symmetric match circuit has a first input port for receiving an address from the host processor bus, and a second input port for receiving a predetermined bit pattern. The non-symmetric match circuit generates a non-symmetric match signal if 1) the address matches the tag entry address; and 2) the address is not a predetermined non-cacheable address.

The hit determination circuit also includes a hit signal generator that is coupled to the symmetric match circuit and the non-symmetric match circuit. The hit signal generator generates a hit signal that indicates that a particular address is in a cache tag and that corresponding data is in a cache memory, when one of the symmetric match signal and the non-symmetric match signal is asserted.

Thus, the present invention supports a non-symmetrical multi-way set associative cache system that may be of any data cache size. The present invention eliminates the restriction that a cache size be equal to $2^P$ (where P is any positive integer including 0). The present invention supports a cache architecture that provides a flexible configuration.

BRIEF DESCRIPTION OF THE DRAWINGS

The present invention may be understood more fully from the detailed description given below and from the accompanying drawings of the preferred embodiment of the invention which, however, should not be taken to limit the invention to the specific embodiment but are for explanation and understanding only.

DETAILED DESCRIPTION

In the following description, numerous details are set forth in order to provide a thorough understanding of the present invention. However, it will be understood by one of ordinary skill in the art that these specific details are not required in order to practice the invention. In other instances, well-known electrical structures and circuits are shown in block diagram form in order not to obscure the present invention with unnecessary detail.

As noted in the background, the prior art Multi-Way Set Associative cache systems are "symmetric" in that these cache systems have a plurality of banks, where all the banks are of the same size. The drawback of these systems is the inflexibility when upgrading the cache to a different size (i.e., increasing the cache capacity).

In describing a Non-Symmetrical Multi-Way Set Associative Cache System, the following definitions will apply. First, there are N banks of cache, where N is any positive integer greater than one (N>1). In other words, there are at least two banks of cache in this cache system. Second, there are M different bank sizes, where M is greater than 1 and less than or equal to N (i.e., 1<M<=N). In other words, there are at least two different bank sizes. Third, the smallest bank size is equal to $2^{(x+1)}$, and the largest bank size is equal to $2^{(Y+1)}$. Note that the exponent is (X+1), because X refers to the subscript of the highest address bit necessary to adequately address a particular bank size. Fourth, K represents a bank number, where K is greater than or equal to 0 and less than or equal to (N−1) (i.e., 0<=K<=(N−1)). In other words, begin numbering the banks starting with bank0. Furthermore, the size of each bank equals $2^{(T_k+1)}$ bytes, where $T_k$ is greater than or equal to X and less than or equal to Y (i.e., X<=$T_k$<=Y). Fifth, the cacheable range of the non-symmetric cache system is equal to $2^{(z+1)}$ bytes. The address bits, arranged in a binary format, are represented by $A_{[z:0]}$. Sixth, each cache line is $2^{(L+1)}$ bytes in size, where L is greater than or equal to O and less than or equal to x, and Y is greater than X and less than or equal to Z (0<=L<= X<Y<=Z). Last, each bank's tag index address uses $A_{(L+1)}$ to $A(T_k)$, where K is greater than or equal to 0 and less than or equal to (N−1) (0<=K<=(N−1)).

Having the definitions set forth as noted above, embodiments of the present invention will now be described.

Figure 1:
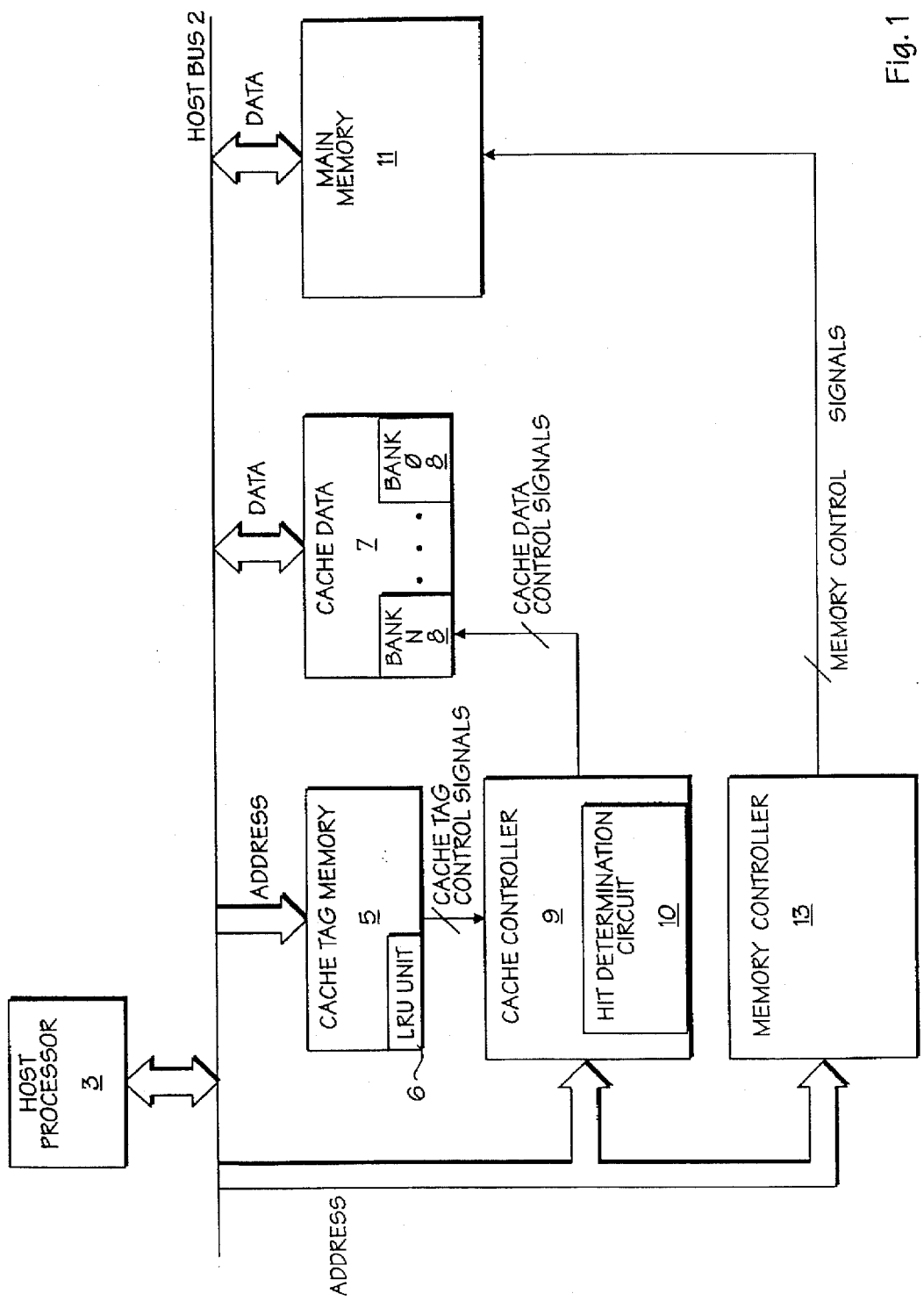
FIG. 1 illustrates a computer system in which the present invention may be implemented.

FIG. 1 illustrates a computer system in which the present invention may be implemented. The computer system includes a host processor bus 2 that couples a host processor 3 to a cache tag memory 5, a cache data memory 7 and a main memory 11. A cache controller 9 is employed to control both the cache tag memory 5 and the cache data memory 7.

Similarly, a memory controller 13 is employed to control accesses (i.e., read and write instructions) to main memory 11. As is evident from FIG. 1, the host processor bus 2 provides addresses to the cache tag memory 5, cache controller 9, and the memory controller 13. The processor bus 2 provides data to the cache data memory 7 and the main memory 11. The cache data memory 7 and the main memory 11 exchange data through the host bus 2.

A Multi-Way cache tag memory 5 typically employs a Least Recently Used (LRU) unit 6 for storing information of those cache tags that are least frequently used. Cache controller 9 includes hit determination circuit 10, which will be described in detail hereinafter with reference to FIGS. 2-4.

The cache data memory 7 is typically partitioned into banks 8 (e.g., bank0, bank1 , . . . bankN). In the prior art, all these banks were necessarily the same size. The present invention allows for these banks 8 to be of different sizes.

Figure 2:
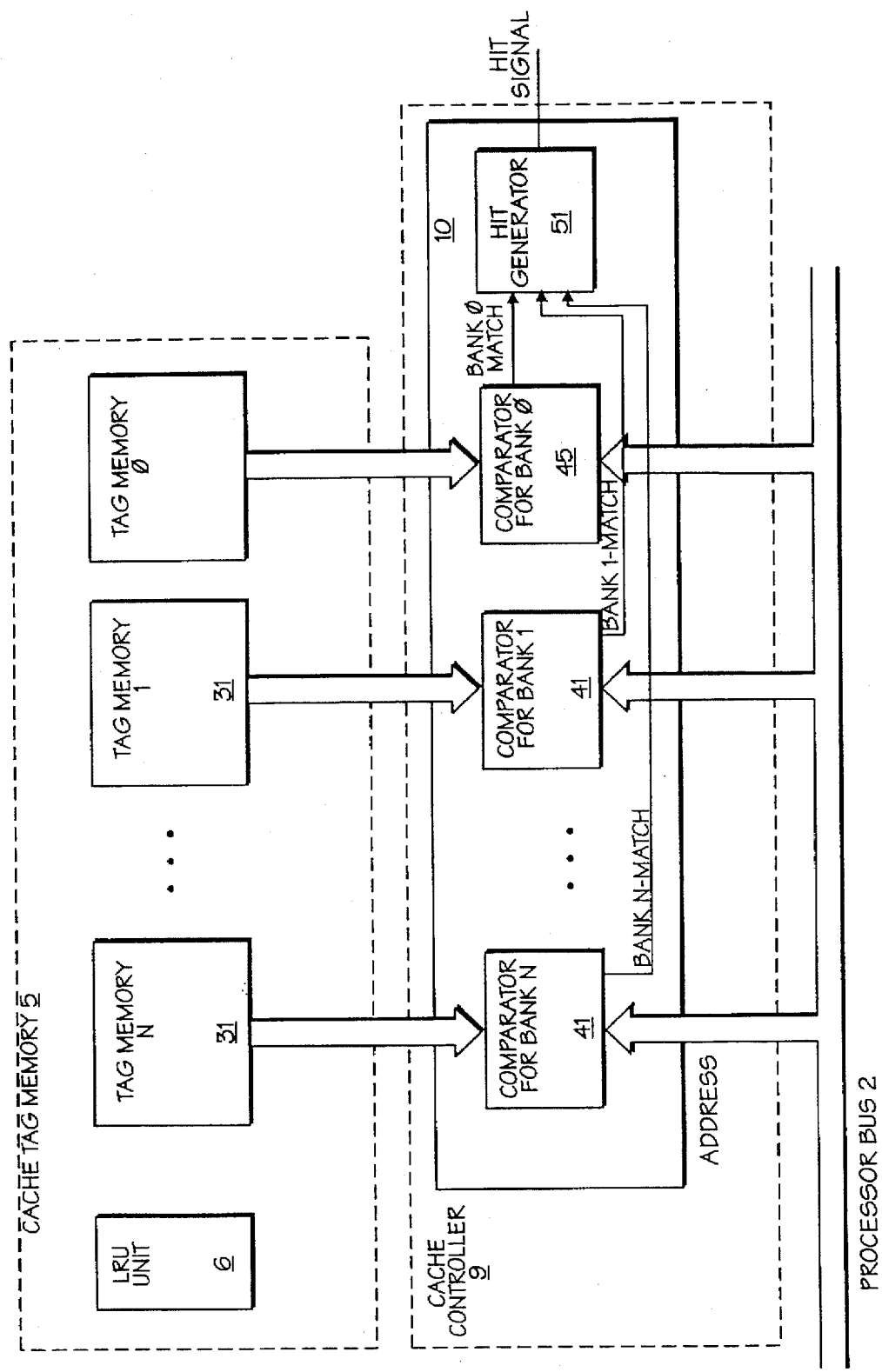
FIG. 2 illustrates in greater detail a cache controller according to one embodiment of the present invention.

FIG. 2 illustrates how the hit determination circuit 10 interfaces with the cache tag memory 5. The cache tag memory 5 is partitioned into tag memories 31 (e.g., tag memory0, tag memory1, . . . tag memoryN).

As mentioned previously, the hit determination circuit 10 may be implemented in the cache controller 9. The hit determination circuit 10 is adapted to handle non-symmetric caches and includes a plurality of comparator circuits 41 (e.g., comparator for tag memory 1 . . . comparator for tag memoryN). As illustrated in FIG. 2, there is typically a comparator circuit associated with each bank 8 in the cache data memory 7. Each comparator 41 has an input port for receiving an address from the host processor bus 2 and a second input port for receiving a tag entry from the tag memory 31 associated with the respective bank 8 in the cache data memory 7. If there is a match between the address on the host processor bus 2 and a tag entry from the respective tag memory 31 in the cache tag memory 5, the comparator circuit 41 generates a bank match signal, which indicates that a match has occurred.

The hit determination circuit 10 is adapted to handle non-symmetric caches and also includes a hit signal generator 51. The hit signal generator 51 receives the bank match signals from each of the comparators 41 and generates a hit signal that indicates to the computer system whether or not an address is located in a tag memory 31 in the cache tag memory 5.

In this embodiment, bank0 has a different size from the remaining banks (i.e., banks1 through N). Accordingly, the comparator 45 for bank0 employs non-symmetric match logic, which will be described in further detail for reference to FIGS. 3 and 4.

When the banks 8 are of more than one size (e.g., four different bank sizes in the cache tag memory), there is a non-symmetric match logic corresponding to each bank 31 that is smaller in size than the largest bank (i.e., each of the banks smaller than $2^{(Y+1)}$ bytes has an associated non-symmetric logic circuit).

Figure 3:
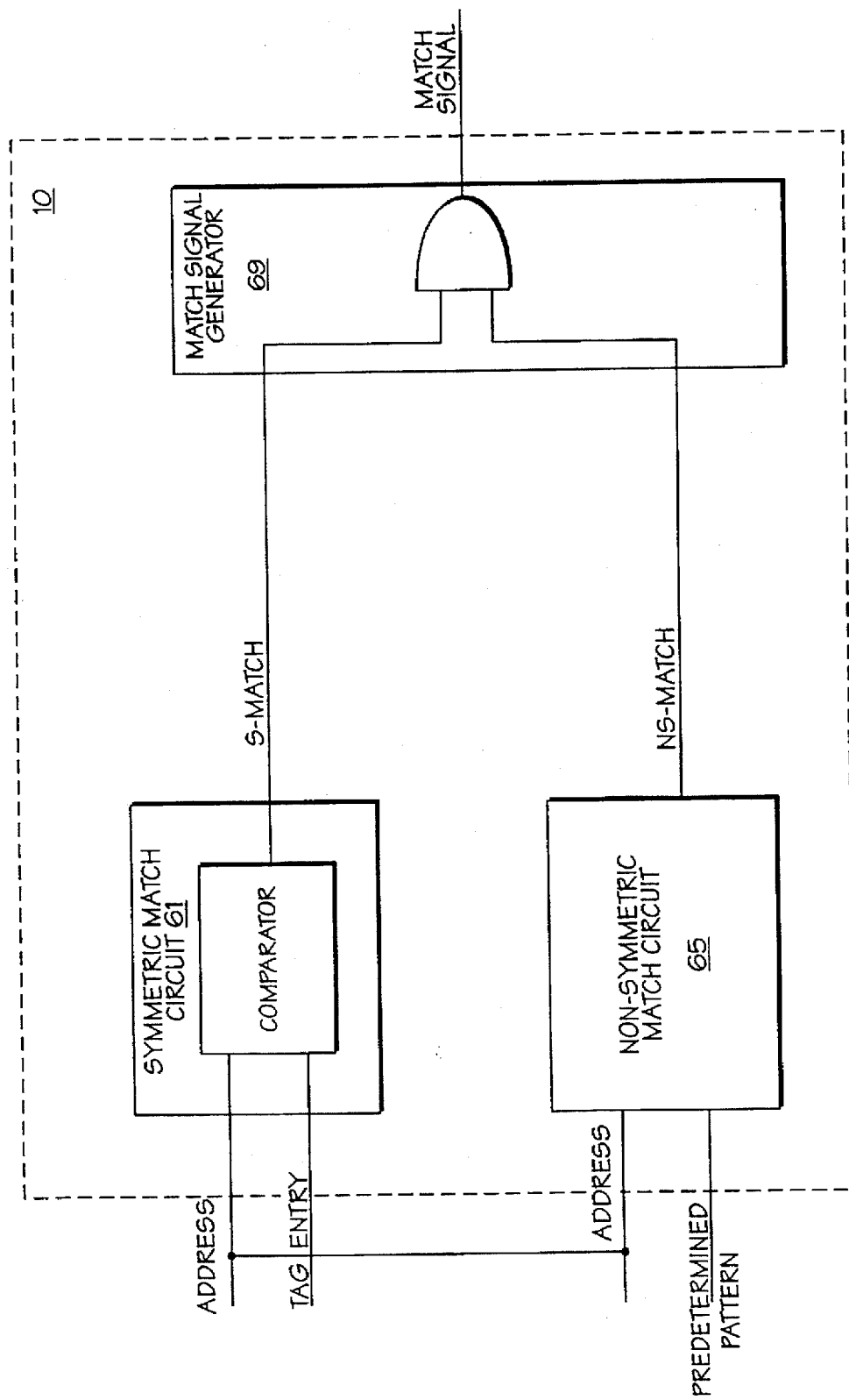
FIG. 3 illustrates a hit determination circuit according to one embodiment of the present invention.

FIG. 3 illustrates in greater detail a block diagram of hit determination circuit 10 according to one embodiment of the preset invention. As noted previously, the hit determination circuit 10 is adapted to handle non-symmetric caches and includes a symmetric match circuit 61 and a non-symmetric match circuit 65. The symmetric match circuit 61 is employed in comparators 1 through N 41 of FIG. 2. The non-symmetric match circuit 65 is employed in comparator0 45, which is associated with bank 0 of cache data memory 7.

The symmetric match circuit 61 may be implemented using a comparator that compares a present address on the processor bus 2 to a tag entry and generates a symmetric match (S-match) signal if there is a match. The symmetric match circuit 61 is well-known in the prior art.

The non-symmetric match circuit 65 has a first input port for receiving an address from the processor bus 2 and a second input port for receiving a predetermined address pattern. The non-symmetric match circuit 65 generates a non-symmetric match (NS-match) signal if the address is the same as the predetermined pattern.

The hit determination circuit 10 includes a signal generator 69 that receives the NS-match signal from the non-symmetric match circuit 65 and the S-match signals from the symmetric match circuits 61 and generates the hit signal. The hit signal indicates to the computer system that the desired data resides in the cache data memory 7. The signal generator 51 may be implemented using an AND gate. The inputs of this AND gate are the S-match signal generated by the symmetric match circuit 61 and the NS-match signal generated by the non-symmetric match circuit 65.

Figure 4:
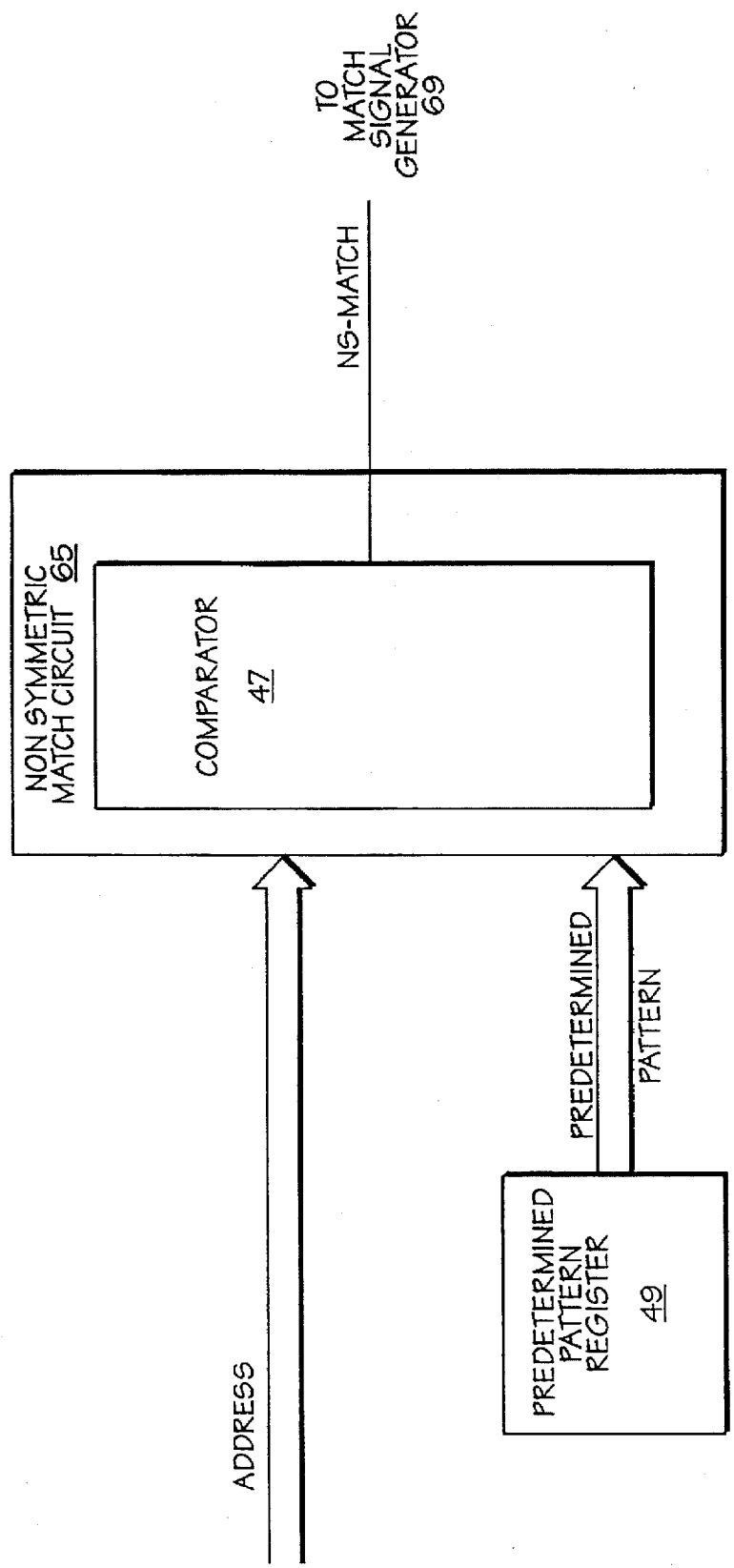
FIG. 4 illustrates in greater detail a non-symmetric match circuit for use in the hit determination circuit of FIG. 3.

FIG. 4 illustrates in greater detail the non-symmetric match circuit 65 of FIG. 3. The non-symmetric match circuit 65 includes a comparator circuit 47 that is coupled to predetermined pattern register 49. The predetermined pattern register 49 includes a plurality of predetermined addresses that are not cacheable and therefore not resident in the cache tag memory 5. The comparator 47 compares selected bits of the address to the predetermined pattern.

In this embodiment, the predetermined pattern register 49 is implemented using configuration registers of the computer system. Each bank of the cache tag memory 5 has associated with it a corresponding configuration register that stores a predetermined pattern. The predetermined pattern depends on the system configuration and the size of that particular bank with respect to the largest bank in the cache tag.

For example, in a computer system in which the cache data memory 7 has two banks 8, a first bank having a size of 256K and a second bank having a size of 512K, the following would be stored in the corresponding configuration registers. For the configuration register corresponding to the second data bank (512K), nothing is stored in this register since all 512K is cacheable. For the first bank having a size of 256K, the configuration register, associated with the first bank, stores a 0. In this case, a comparison is made between the 0 value stored in the configuration (i.e., the zero value) register and address bit, A[18]. If A[18] of the address is 0 and the S-match signal is also asserted, that particular bank is a hit. However, if A[18] is a 1, that bank is a miss.

As noted previously, the comparator circuit 47 compares selected bits of the address to the predetermined pattern received from the predetermined pattern register 49. The comparator circuit 47 generates a logical high signal when the address matches the predetermined address pattern. The output of the comparator circuit 47 is the non-symmetric signal match (NS-match) which is sent to the generator 69.

In this embodiment, the largest size bank (i.e., when $T_K=Y$) is cacheable in the entire cacheable range $(2^{(z+1)})$. In other words, the match logic within the cache controller 9 is not modified by the present invention for the largest bank. The prior art match logic in symmetric cache controllers are adapted to handle this case.

For all other banks having a size smaller than the largest size (i.e. $T_K$ less than Y), the cache controller 9 of the present invention evaluates a predetermined number of address bits to identify a specific pattern. If the predetermined pattern is detected, and the S-match signal is asserted, the bank is a hit. However, if this specific pattern is not detected, that particular bank is a miss.

The present cache controller 9 includes non-symmetric match circuit 65 that evaluates predetermined address bits in conjunction with the symmetric match logic. Thus, when address bits, $A_{(Tk+1)}$ to $A_{(y)}$, are equal to a predetermined pattern (e.g., all zeros), that particular bank K is selected and is therefore a hit.

In the foregoing specification, the invention has been described with referenced to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than restrictive.

What is claimed is:

1. A cache controller, comprising:
   a symmetric match circuit configured to compare a cache tag address with an address received on a host bus;
   a non-symmetric match circuit configured to compare a predetermined non-cacheable address with said address received on the host bus; and
   a hit signal generator coupled to said symmetric match circuit and said non-symmetric match circuit and configured to generate a hit signal when said cache tag address matches said address received on the host bus and said predetermined non-cacheable address does not match said address received on the host bus.

2. A cache controller as in claim 1, wherein said symmetric match circuit comprises a comparator.

3. A cache controller as in claim 2, wherein said non-symmetric match circuit comprises a comparator.

4. A cache controller as in claim 2, wherein said predetermined non-cacheable address is provided by a configuration register of a computer system which includes said cache controller.

5. A cache controller as in claim 4, wherein said non-symmetric match circuit further comprises a comparator configured to compare said address received from said host bus to a tag address received from a tag memory associated with said non-symmetric match circuit.

6. A cache controller as in claim 5, wherein said non-symmetric match circuit further comprises a non-symmetric match signal generator configured to generate a non-symmetric match signal when said address received from said host bus does not match said predetermined non-cacheable address.

7. A cache controller as in claim 6, wherein said non-symmetric match signal generator comprises an AND gate.

8. A cache memory system, comprising:

a cache data memory having at least two cache banks of different sizes;

a cache tag memory organized so as to include tag memories for each of the cache banks of the cache data memory; and a cache controller coupled to said cache tag memory and said cache data memory and including symmetric match logic and non-symmetric match logic, the symmetric match logic for comparing an address received on a host bus with tag addresses from at first of said tag memories and non-symmetric match logic for comparing the address received on the host bus with tag addresses from a second of said tag memories and a predetermined pattern representing non-cacheable addresses within a cache bank of said cache data memory corresponding to said second tag memory.

9. A cache memory system as in claim 8 wherein said symmetric match logic comprises a comparator.

10. A cache memory system as in claim 9 wherein said non-symmetric match logic comprises a symmetric match circuit for comparing the address received on the host bus with tag addresses from said second tag memory and a comparator for comparing said predetermined pattern with the address received on the host bus.

11. A cache memory system as in claim 10 further comprising a hit signal generator configured to generate a hit signal indicating that an address is contained in said cache tag memory when the address received on the host bus matches an address contained in said cache tag memory and does not match said predetermined pattern.

12. A method of generating a cache hit signal in a non-symmetric cache system, comprising the steps of:

receiving an address on a host bus;

comparing said address on said host bus to a cache tag address;

comparing said address on said host bus to a predetermined patterned representing non-cacheable addresses; and generating a hit signal if said address on said host bus matches said cache tag address and does not match said predetermined pattern.

\* \* \* \* \*